(12) United States Patent
Cook

(10) Patent No.: US 11,808,405 B2
(45) Date of Patent: Nov. 7, 2023

(54) BODY MOUNTED SIGN HOLDING DEVICE AND KIT

(71) Applicant: Christopher B Cook, Whispering Pines, NC (US)

(72) Inventor: Christopher B Cook, Whispering Pines, NC (US)

( * ) Notice: Subject to any disclaimer, the term of this patent is extended or adjusted under 35 U.S.C. 154(b) by 0 days.

(21) Appl. No.: 17/397,094

(22) Filed: Aug. 9, 2021

(65) Prior Publication Data

US 2023/0038836 A1  Feb. 9, 2023

(51) Int. Cl.
*G09F 21/02* (2006.01)
*F16M 13/04* (2006.01)

(52) U.S. Cl.
CPC .................. *F16M 13/04* (2013.01)

(58) Field of Classification Search
CPC ...... G09F 21/02; G09F 21/023; G09F 21/026; F16M 13/04; A45F 2003/001; A45F 2003/148; A45F 3/14
See application file for complete search history.

(56) References Cited

U.S. PATENT DOCUMENTS

| | | | | |
|---|---|---|---|---|
| 518,780 A * | 4/1894 | Fogg | ........................ | G09F 21/02 40/586 |
| 853,397 A * | 5/1907 | Butler | .................... | A45B 11/02 224/190 |
| 3,030,109 A | 4/1962 | Albitz | | |
| 3,114,486 A | 12/1963 | Flexman | | |
| 3,122,736 A | 2/1964 | Weber | | |
| 3,946,699 A * | 3/1976 | Mirshak | .................. | G09F 17/00 116/173 |
| 5,044,200 A * | 9/1991 | Dailey | ...................... | G09F 7/18 52/103 |
| 5,083,956 A | 1/1992 | Chraghchian | | |
| 5,892,445 A * | 4/1999 | Tomich | .................. | G08B 5/004 362/108 |
| 6,450,377 B1 | 9/2002 | Oriolo | | |
| 6,547,204 B1 * | 4/2003 | Peck | ......................... | G09F 7/18 248/545 |
| 7,133,002 B2 | 11/2006 | Anglois | | |
| 7,302,768 B2 * | 12/2007 | Gajdacs | ................ | G09F 21/041 40/607.03 |
| 7,654,218 B1 | 2/2010 | Marlette | | |
| 7,779,567 B2 * | 8/2010 | Saliege | .................... | G09F 21/02 40/586 |
| 8,997,386 B2 * | 4/2015 | Lee | .......................... | G09F 19/08 40/538 |
| 9,536,458 B2 * | 1/2017 | Evans | ....................... | A45F 3/14 |

* cited by examiner

*Primary Examiner* — Adam J Waggenspack
(74) *Attorney, Agent, or Firm* — Olive & Olive, P.A.

(57) ABSTRACT

There is disclosed a kit for assembling a body-mounted sign holder on which one or more signs can be mounted to display multiple messages without engaging a person's hands when the messages on the sign are displayed. There is also disclosed a sign holding device, in particular, one which is lightweight when worn and used, for example, during protest marches.

2 Claims, 5 Drawing Sheets

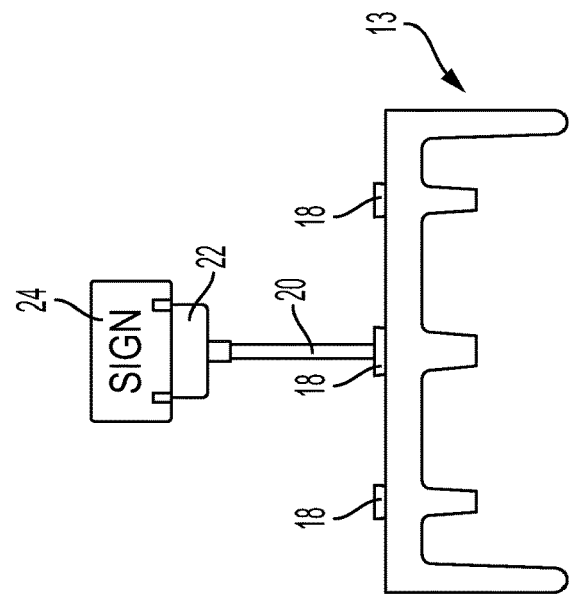
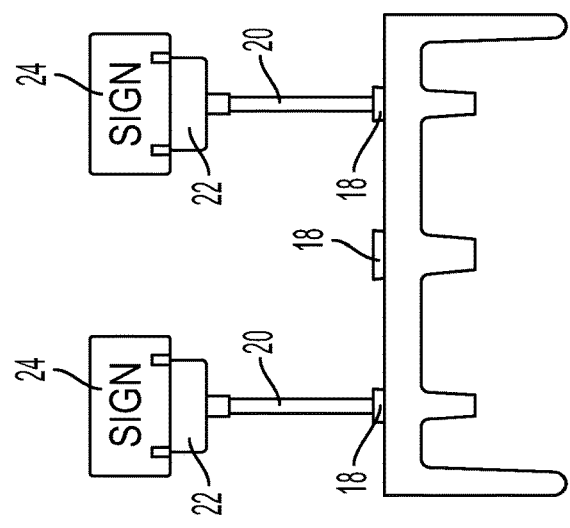
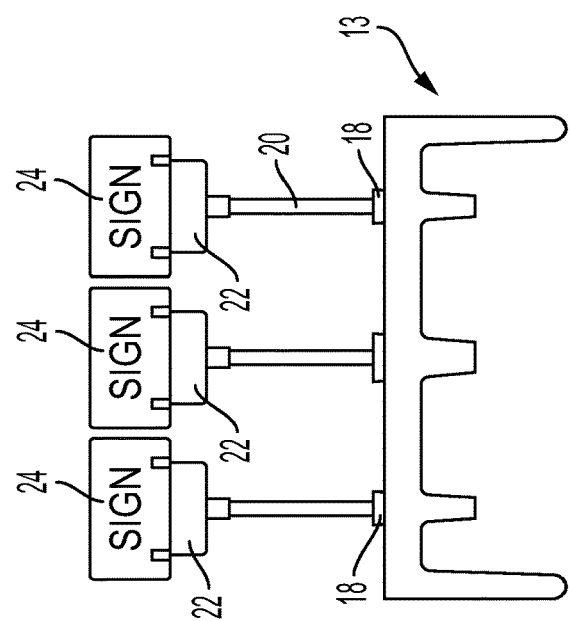

BODY MOUNTED SIGN HOLDING DEVICE AND KIT

FIELD OF THE INVENTION

This invention relates to a kit for assembling a body-mounted sign holder on which one or more signs can be mounted to display multiple messages without engaging a person's hands when the messages on the sign are displayed. The invention also relates to a sign holding device, in particular, one which is lightweight when worn and used, for example, during protest marches.

BACKGROUND OF THE INVENTION

Body mounted sign carrying systems and devices come in many forms. Most sign carrying systems are designed to carry one sign and are cumbersome, heavy and difficult to carry or wear. Such sign carrying systems are often seen on road construction sites, with heavy flashing lights making up part of the system. As a result, signs supported by such sign carrying systems are difficult to carry, heavy and the user requires frequent breaks to alleviate frequent tiring.

In present society, social injustice has become of great concern, and a current trend to address such social injustice has developed where protest marches are held regularly to raise awareness about injustice in society.

As part of these protests, individuals often wish to carry signs with messages addressing the social injustice the protester seeks to have remedied. However, as time passes, carrying the sign becomes tedious and tiring, unnecessarily occupies the carrier's hands and is limited in terms of the messages that can be displayed due to size constraints.

Accordingly, it has become desirable to provide a system or device to allow display of one or more messages during a protest march without having to use cumbersome and heavy devices, while leaving a protester's hands free for uses other than carrying and displaying the messages on a sign.

SUMMARY OF THE INVENTION

In accordance with one aspect of the invention, there is provided a kit for assembling a lightweight body mounted sign carrying system or device capable of displaying multiple signs at once, for example, in a protest march. The kit allows multiple configurations of the sign carrying system, allowing one or more signs to be carried and displayed.

The kit and device made from the kit of the invention includes a shoulder-mounted harness with up to three receiving members, which are hollow for receiving sign poles therein to display a sign being held by each pole. The shoulder mounted harness is designed to be retained on the shoulders of the wearer. External retainers, such as straps can be used which extend under a user's arms to connect at each end of the strap to the shoulder mounted harness to secure the sign holder on a user's shoulders. Alternatively, the retainers can be built into the shoulder mounts of the harness.

BRIEF DESCRIPTION OF THE DRAWINGS

Having briefly described the invention, the same will become better understood from the following detailed description made with reference to the appended drawings, wherein:

FIGS. 4A, 4B and 4C show three embodiments of the shoulder harness of the sign holder invention, respectively, with one, two, and three signs mounted thereon.

DETAILED DESCRIPTION OF EXEMPLARY EMBODIMENTS

The invention relates to a kit for assembling a number of components on a shoulder mounted harness ("shoulder harness") that is capable of supporting up to three signs. The shoulder harness has three separate receiving members, each having an opening, each receiving member being designed for holding a sign support. The sign support may be, for example, a pole or rod made of wood or of material of the type typically used in fishing rods, or other materials typically used to support hand-held signs used in street-side advertising or in protest marches. The sign support sits in the opening of the receiving member. A sign—for example, a piece of cardboard or other material traditionally used for hand-held signs—is attached at the end of the sign support to display a message.

The sign is preferably secured to the sign support by one or more retainers—for example, sign-holding clips. The clips may be fork-shaped, to both support and secure the cardboard sign. Of course, instead of the clip shown in the Figures, the retainers may comprise a nut and bolt, or adhesive tape, or screws, or other retainers.

The main purpose of the device is to relieve a person's arms from holding a sign for hours at a time. Also, the device frees up a person to do other things while holding or displaying a sign. For example, the invention allows one to march, stand or sit without having to extend an arm for long periods of time, reducing stress on the arms.

As described previously, the various components of the invention can be easily assembled as a kit which can be put together to result in the sign carrying device or system of the invention. The components for the kit may be carried in a box and printed assembly instructions may be placed in the box with the components of the kit (not shown).

Figure 1A:
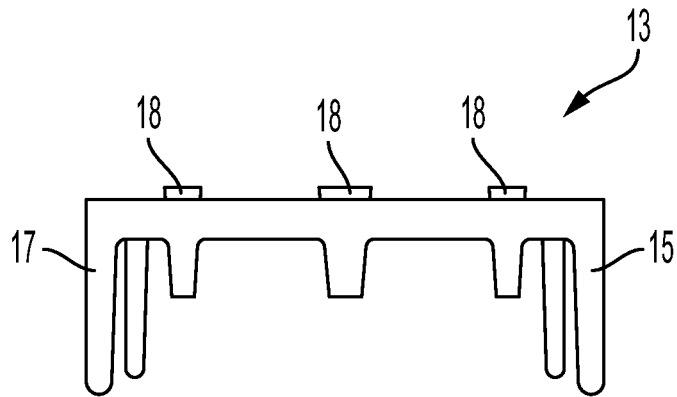
FIG. 1A is a view of a front shoulder harness of the invention showing various components making up an embodiment of the sign holder kit of the invention.
Figure 1D:
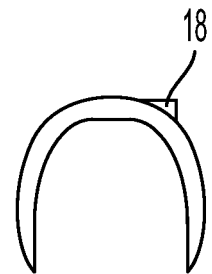
FIG. 1D is a side view of the shoulder harness.
Figure 1B:
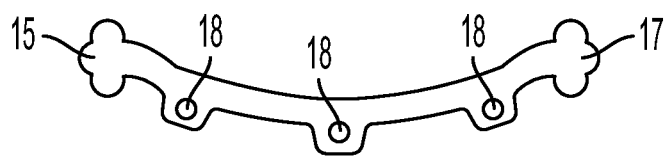
FIG. 1B is a top view of the shoulder harness.
Figure 1E:
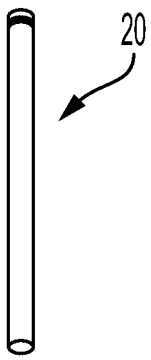
FIG. 1E is a perspective view of a sign support comprising part of the invention.
Figure 1C:
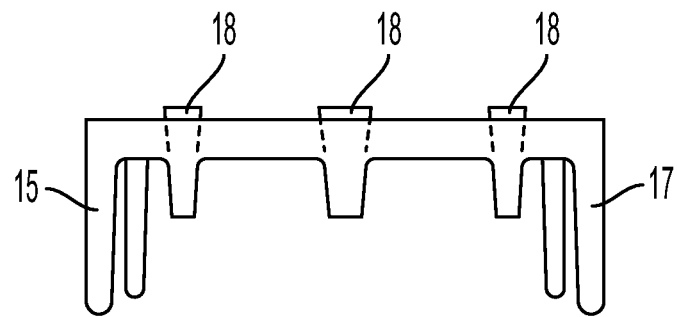
FIG. 1C is a back view of the shoulder harness.
Figure 1F:
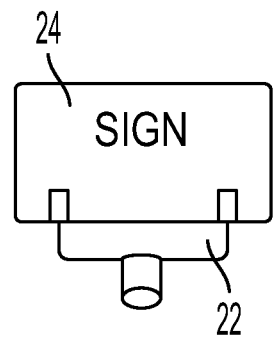
FIG. 1F is a perspective view of a sign retainer.

In the drawings, FIGS. 1A-1F are views of several components of the kit for assembling the device of the invention. FIG. 1A is a front view of a shoulder harness 13 of the sign holder kit. The shoulder harness 13 includes a left side 15 and a right side 17 and the harness 13 fits on a user's shoulders. The shoulder harness 13 also comprises receiving members 18, preferably built into the shoulder harness 13, which have an opening for receiving a sign support therein. FIG. 1D is a side view of the shoulder harness 13. FIG. 1E is a view of a sign support 20 and FIG. 1F is a view of a sign retainer 22 (depicted in this embodiment as a sign holder clip) to hold sign 24 on sign support 20.

FIG. 1B is a top view of the shoulder harness 13, and FIG. 1C is a back view of shoulder harness 13.

Figure 2A:
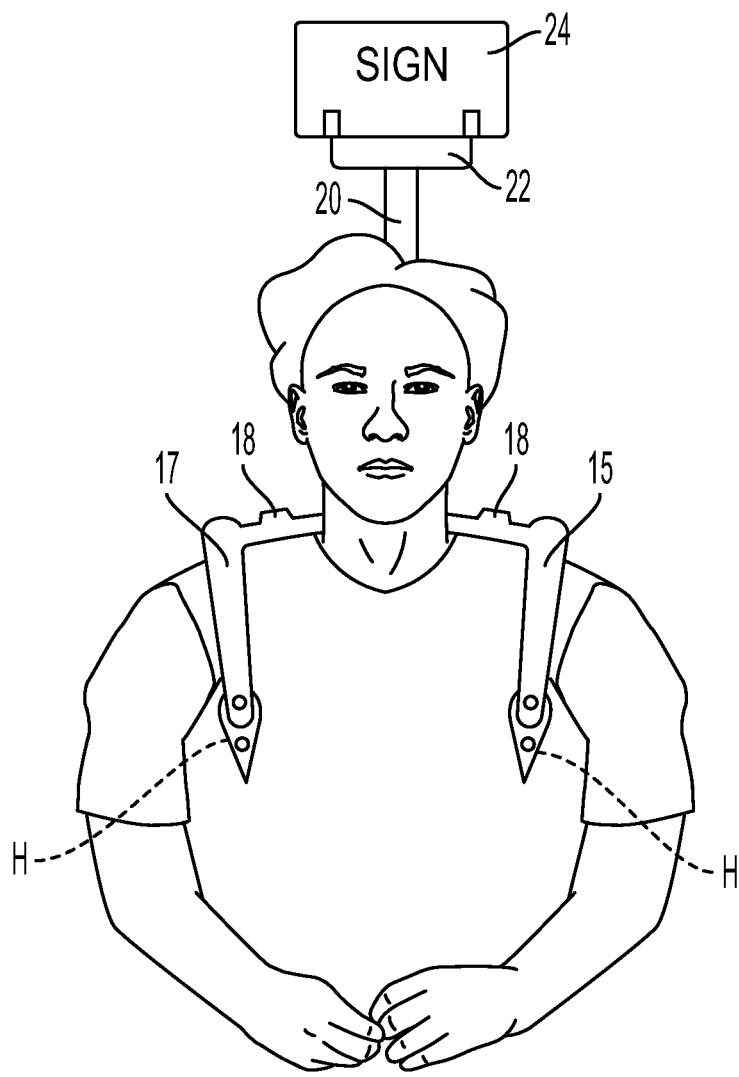
FIG. 2A is a front view of an embodiment of the sign holder of the invention shown mounted on a user.
Figure 2B:
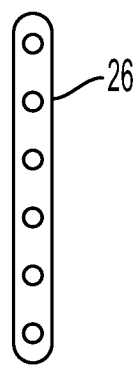
FIG. 2B is a plan view of a shoulder harness retainer.

FIG. 2A is a view of an embodiment of the sign holder of the invention, fully assembled and worn by a user. FIG. 2B is a view of a shoulder harness retainer. The shoulder harness retainer secures the harness to the user's body. In the embodiment depicted in FIG. 2B, the shoulder harness retainer is a strap 26 that wraps under the user's underarm.

Figure 3:
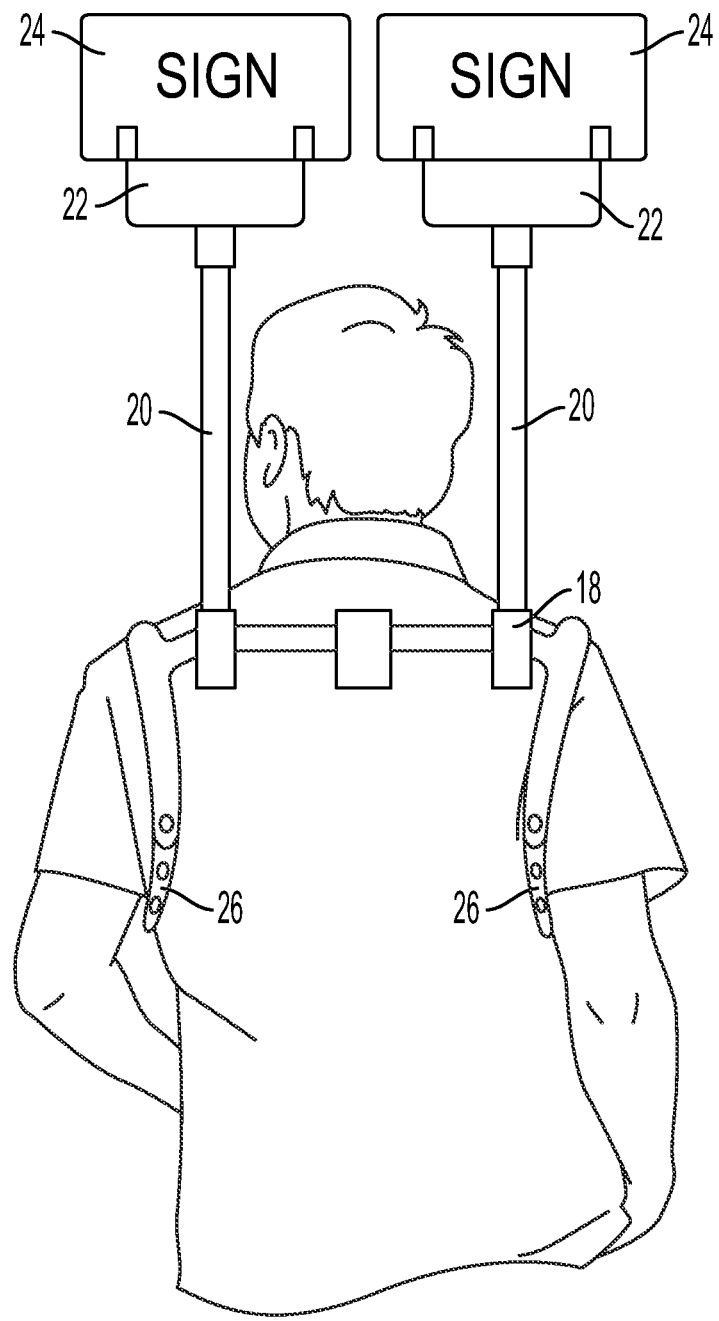
FIG. 3 is a rear view of an embodiment the sign holder device invention mounted on a user's shoulders, and supporting two signs.

FIG. 3 is a rear view of an embodiment of the inventive sign holder fully assembled and worn by a user, showing the shoulder harness retainer in the form of straps 26 securing the device to the user's body.

While straps 26, secured to the shoulder harness 13 at each end of the strap 26, are shown, it will be appreciated that the shoulder harness retainer can take many forms. The shoulder harness retainer may be a vest to which the harness is secured or, if a strap-style retainer is preferred, may utilize by way of example bungee cords or strips of fabric having hook and loop sections to allow rapid connection and disconnection. Alternatively, a separate shoulder harness retainer is not required. For example, the shoulder harness retainer can be constructed within the shoulder harness 13, by forming the shoulder harness 13 to adhere to a user's shoulders by a press fit engagement. Preferably, if a press fit engagement is utilized, the shoulder areas of shoulder harness 13 each are formed of a flexible material in the shape of a human shoulder but slightly smaller than the shoulders of the human intended to bear the shoulder harness 13. The flexible material allows the shoulder areas of harness 13 to open sufficiently to fit over the top of the user's shoulders and then to clasp the shoulders tightly in a press fit engagement. The grip of the press fit engagement can be enhanced by adding to the interior of the shoulder-clasping portion of the shoulder harness 13 a material having a high coefficient of friction. Such materials are well-known. Silicone shoulder pads, for example, can be utilized.

FIGS. 4A-4C show respectively different front views of tan embodiment of the sign holder with 3 signs, 2 signs, and 1 sign, respectively, mounted thereon.

Figure 5:
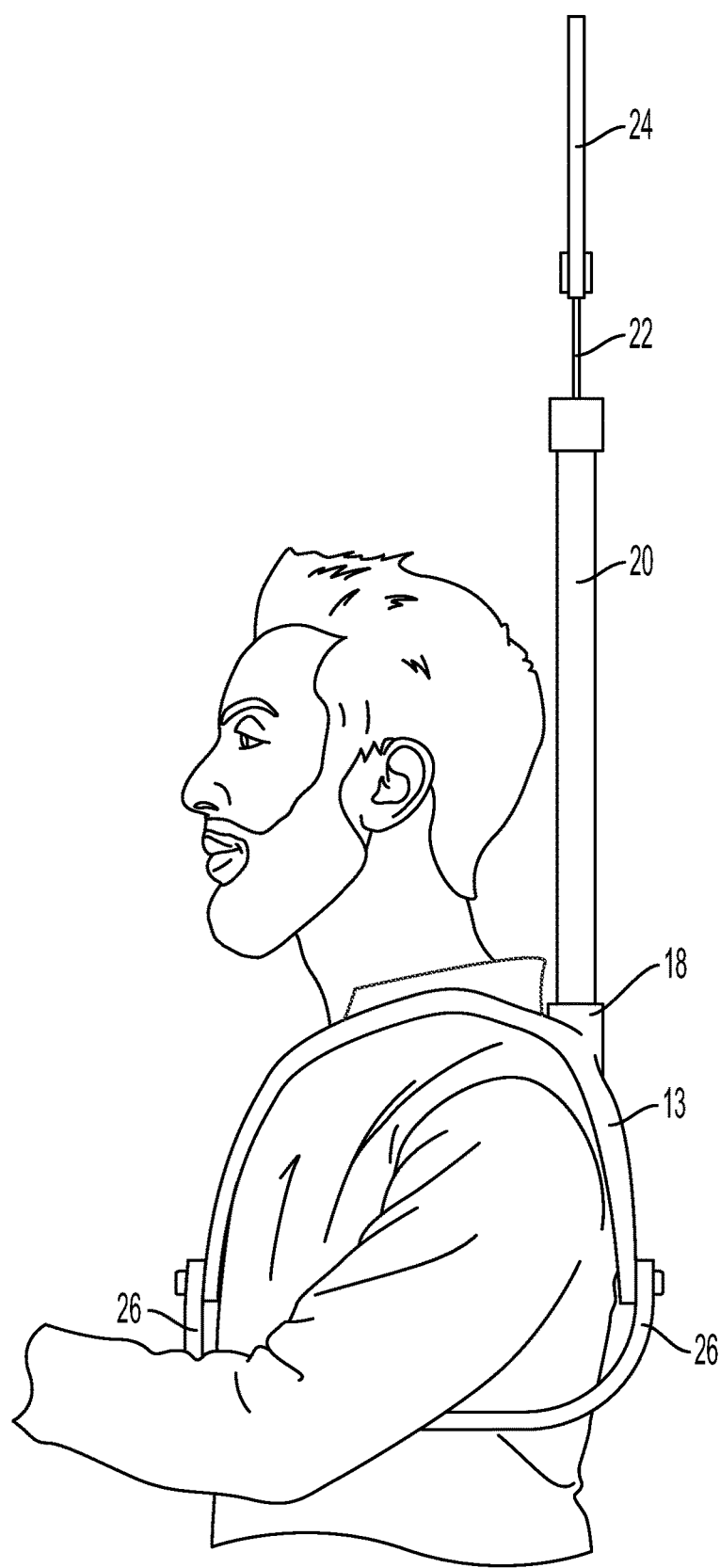
FIG. 5 is a side view of the sign holder of the invention, mounted on a user and carrying only one sign.

FIG. 5 is a side view of an embodiment of the inventive sign holder worn by a user.

With respect to the materials used, the sign supports 20 may be made lightweight, for example, of polyethylene, capable of withstanding hot weather and cold weather, and sufficiently durable to not break easily. The size of the signs 24 may vary according to the needs and physical strength of the user. Often users desire to carry large signs so that their message can be seen over a greater distance. If the sign size is very large, it is preferable to carry only one sign. Alternatively, if small enough, three signs may conveniently be carried.

As may be appreciated, the various components can be packaged together unassembled to provide a kit for assembling the sign carrying system or device of the invention. Likewise, some or all of the components can be preassembled or may be constructed as a single piece. In use, the sign holder may be reversed from the directions shown in the figures, such that the signs are in front of the user rather than behind, depending on the user's preference.

A preferred embodiment of a kit according to the invention includes a shoulder harness 13 shaped for being supported on a user's shoulders and extending the length of a user's shoulders to be supported on the shoulders.

The kit also may include a shoulder harness retainer that is not built into the shoulder harness. In one embodiment, the shoulder harness retainer comprises straps 26, which are attachable to an attachment point on the back of the shoulder harness 13 and of sufficient length to be passed under a user's armpit and then attached to the front of the shoulder harness.

Having described the invention, the same will become better understood from the appended claims in which is it set forth in a non-limiting manner.

What is claimed:

1. A sign holder for wearing by a user, comprising:
   a) a shoulder harness shaped for being supported on a user's shoulders and extending to rest on a length of a user's shoulders on each side of a user's head allowing the user's head to extend upwardly through the shoulder harness;
   b) shoulder harness retainer straps for retaining the shoulder harness on the shoulders of a user by passing through the under arm regions of a user and connecting at each strap end to the shoulder harness;
   c) at least three receiving members located on the shoulder harness, having an open interior for receiving a sign support therein; and
   d) at least three sign supports and three sign retainers, each attachable to at least one of the sign supports for having a sign secured thereto.

2. A kit for assembling a sign holder capable of displaying multiple signs, to be worn by a user, comprising:
   a) a shoulder harness shaped for being supported on a user's shoulders and extending a length of a user's shoulders on each side of a user's head allowing the user's head to extend upwardly through the shoulder harness;
   b) shoulder harness retainer straps for retaining the shoulder harness on the shoulders of a user by passing through the underarm regions of a user and connecting at each strap end to the shoulder harness;
   c) at least three receiving members located on the shoulder harness, each having an open interior for receiving a sign support therein; and
   d) at least three sign supports and three sign retainers, each attachable to at least one of the sign supports for having a sign secured thereto.

* * * * *